United States Patent [19]

Abe

[11] Patent Number: 5,207,741
[45] Date of Patent: May 4, 1993

[54] RELEASE ASSEMBLY FOR A PULL-TYPE CLUTCH

[75] Inventor: Minoru Abe, Neyagawa, Japan

[73] Assignee: Daikin Clutch Corporation, Neyagawa, Japan

[21] Appl. No.: 775,400

[22] Filed: Oct. 15, 1991

[30] Foreign Application Priority Data

Oct. 18, 1990 [JP] Japan ............................. 2-109686[U]

[51] Int. Cl.⁵ ............................................. F16D 23/14
[52] U.S. Cl. .............................. 192/70.13; 192/70.27; 192/89 B; 192/98
[58] Field of Search ............... 192/70.13, 70.27, 89 B, 192/98, 110 B, DIG. 1; 384/495, 498, 612

[56] References Cited

U.S. PATENT DOCUMENTS

| | | | |
|---|---|---|---|
| Re. 33,127 | 12/1989 | Wimbush | 192/91 A |
| 1,431,551 | 10/1922 | White | 192/98 X |
| 3,333,664 | 8/1967 | Chapaitis | 192/98 |
| 3,741,361 | 6/1973 | Brandenstein | 192/110 B |
| 3,882,979 | 5/1975 | Limbacher et al. | 192/98 |
| 3,948,371 | 4/1976 | Lönne | 192/98 |
| 4,305,492 | 12/1981 | Mori et al. | 192/98 |
| 4,478,325 | 10/1984 | Dagiel | 192/98 |
| 4,565,272 | 1/1986 | Miyahara | 192/98 |
| 4,903,807 | 2/1990 | Kabayama et al. | 192/98 |

*Primary Examiner*—Richard M. Lorence
*Attorney, Agent, or Firm*—Armstrong, Westerman, Hattori, McLeland & Naughton

[57] ABSTRACT

A release assembly to a pull-type clutch releases the clutch by extracting the radially inward portion of a diaphragm spring in the direction toward an associated transmission. The release assembly comprises a release bearing and its retainer. The release bearing includes an outer race fixed onto the radially inward margin of the diaphragm spring and an inner race grooved by a concavity along its radially inward portion the focus of which coincides with the pivotal deviation center of the release assembly. A complementarily convex surface along the retainer slidably mates with the concavity of the inner race, allowing the retainer in this release assembly to be slidable along inner race of the release bearing. Accordingly, if the clutch and the transmission come into misalignment, the resultant slide of the retainer on the inner race of the release bearing compensates.

13 Claims, 3 Drawing Sheets

RELEASE ASSEMBLY FOR A PULL-TYPE CLUTCH

BACKGROUND OF THE INVENTION

The present invention relates generally to a release assembly. More specifically, it relates to a clutch release assembly which releases a pull-type clutch by extracting the radially inward margin of its diaphragm spring in the direction of an associated transmission.

In a conventional clutch, composed of a clutch disc and a clutch cover, a diaphragm spring drives a pressure plate toward the flywheel of a motor, thus sandwiching the clutch disc between the pressure plate and the flywheel in order to engage the clutch. In a pull-type clutch, a release assembly extracts the radially inward margin of the diaphragm spring toward the transmission in order to release the clutch.

A conventional release assembly for a pull-type clutch is shown in FIG. 4, in which the line O—O represents the axis of clutch rotation. In the figure, a release bearing 101 is provided adjoining the radially inward margin of a diaphragm spring 102. An outer race 103 of the release bearing 101 is fixed onto the radially inward margin of the diaphragm spring 102. An inner race 104 of the release bearing 101 is supported by a tubular retaining rim 105. The retaining rim 105 is detachably connected through a linkage 106 to a support sleeve 107 embracing the main drive shaft 21 of a transmission (not shown). The support sleeve 107 can be driven in the axial direction of the main drive shaft 21 by a drive mechanism (not shown).

When the support sleeve 107 is driven in the axial direction, the radially inward portion of the diaphragm spring 102 is contiguously moved in the same direction by means of the retaining rim 105 and the release bearing 101 in order to either engage or release the clutch.

If the clutch and the transmission happen to be misaligned, or if they do not possess coinciding axes, the release bearing 101 and other parts of the release assembly disposed between the diaphragm spring 102 and the support sleeve 107 are subject to stress damage, which thus deteriorates the durability of the release assembly.

SUMMARY OF THE INVENTION

It is an object of the present invention to improve the durability of the release assembly to a pull-type clutch by enabling it to compensate misalignment of the clutch with a transmission.

A release assembly according to the present invention releases a pull-type clutch by extracting the radially inward portion of its diaphragm spring in the direction of an associated transmission. It comprises a release bearing and a retainer. The release bearing includes an outer race fixed to the radially inward margin of the diaphragm spring, and an inner race grooved by a concavity, wherein the focus of the concavity coincides with the pivotal deviation center of the assembly. A surface of the retainer is complementarily convex and mates slidably with the concavity of the inner race.

The retainer is thus slidable along the inner race of the release bearing due to the articulation of the complementarily spherical surfaces. Consequently, if the clutch and the transmission come into misalignment, the misalignment is compensated by the sliding of the retainer along the inner race of the release bearing. The durability of the release assembly is thus improved since misalignment stresses are not transmitted to the release bearing nor to its associating members.

The foregoing and other objects and advantages of the present invention will become more apparent from the following detailed description.

DESCRIPTION OF THE PREFERRED EMBODIMENTS

Figure 1:
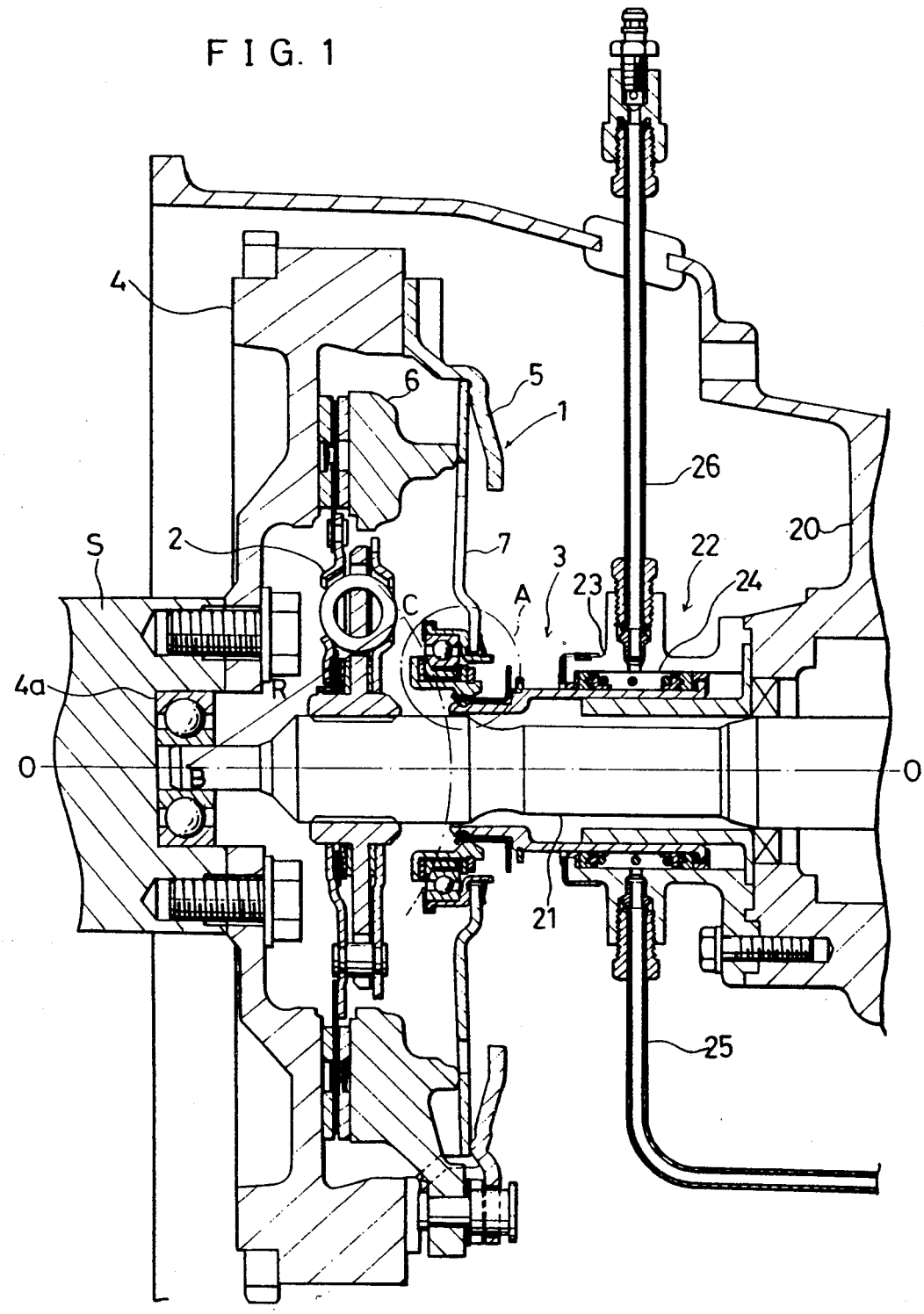
FIG. 1 is a cross-sectional view of a pull-type clutch according to an embodiment of the present invention.

FIG. 1 shows a pull-type clutch to which an embodiment of the present invention is applied. Line O—O is the axis of rotation of the clutch.

Referring to FIG. 1, this pull-type clutch is composed principally of a clutch cover assembly 1, a clutch disc 2 and a release assembly 3.

The clutch cover assembly 1 includes a clutch cover 5 fixed to a flywheel 4 which is attached to the output shafts of an engine, a pressure plate 6 disposed inside the clutch cover 5, and a diaphragm spring 7. The transmission-ward side of the diaphragm spring 7 is supported along its circumferential portion by the clutch cover 5, and the diaphragm spring 7 elastically drives the pressure plate 6 toward the clutch disc 2. Radial slits are provided in the diaphragm spring 7 from the border of its radially inward margin 7a (FIG. 2) to its middle portion, and the radially inward margin 7a is connected to the release assembly 3.

The central portion of the clutch disc 2 is connected to a main drive shaft 21 of a transmission by meshed splines.

Detailed description will now be made of the release assembly 3 with reference to FIG. 2 which is an enlargement of encircled portion A in FIG. 1.

The diaphragm spring 7 is supported along its radially inward margin 7a by a boss 8a of an annular support member 8 and a cone spring 9 fitted onto a projecting portion 8b of the annular support member 8. An outer race 10a of a release bearing 10 is fixed onto the annular support member 8 by a retaining member 11. An inner race 10b of the release bearing 10 includes a lateral spherically shaped concavity 10c. As shown in FIG. 1, the focus B, i.e. the center of the spherical surface of the concavity, coincides with the pivotal deviation center of the inclusive release assembly 3 as described below.

A spherically surfaced bearing seat 12 for inner race 10b consists of a tubular member having a convex spherically shaped lateral surface 12a which slidably mates with the spherical concavity 10c of the inner race 10b. The surface 12a is located in the axially engine-ward direction, or left portion in FIG. 2, of the seat 12.

Both the spherical surfaces 10c and 12a are sections of a sphere C of radius R, the center of which is point B on the axis of rotation in the tip (left end in FIG. 1) of the main drive shaft 21. The tip of the main drive shaft 21 is supported by the central portion of the flywheel 4 through a ball bearing 4a. Therefore, if the axis of the main drive shaft 21 skews from alignment with the axis of the clutch, the point B becomes the pivotal deviation center of release assembly 3 on shaft 21 which is the fulcrum of the misaligning skew, and meanwhile remains the center of the spherical surfaces 10c and 12a.

An engine-ward facing portion of the seat 12 is supported by a flange 14a of a tubular retainer 14 through a resin ring 13. A transmission-ward facing portion of the seat 12 is supported by a wave spring 15 and a retaining member 16 fixed into the transmission-ward portion of the retainer 14. That is, the seat 12 is elastically clamped in the axial direction by the retainer 14. Between the spherically surfaced seat 12 and the retainer 14, there is a radial clearance. This clearance absorbs radial misalignment of the clutch with the transmission.

A snap ring 17 is fitted into a groove of an annular protuberance 14b in an axially transmission-ward portion of the retainer 14. The circumferential surface of a bent portion 18a of a wedge collar 18 retains the inward portion of the snap ring 17. This linkage consisting of the snap ring 17 and the wedge collar 18 detachably connects the retainer with the support sleeve 19.

The support sleeve 19 embraces the main drive shaft 21 (FIG. 1). The main drive shaft 21 extends from a transmission housing 20 positioned beyond the clutch cover 1 toward the clutch. A transmission-ward portion of the support sleeve 19 is connected to a sleeve driving mechanism 22 fixed to the transmission housing 20. The transmission-ward portion of the support sleeve 19 is enclosed in an oil chamber casing 23 of the sleeve driving system 22, forming an oil chamber 24. A pipe 25 for supplying hydraulic pressure to the oil chamber 24 and an air bleeding pipe 26 communicate with the oil chamber 24. The hydraulic pressure of the oil chamber 24 is controlled by the pipe 25, whereby the support sleeve 19 is driven in the axial direction.

The process of assembling the clutch is explained as follows.

Figure 2:
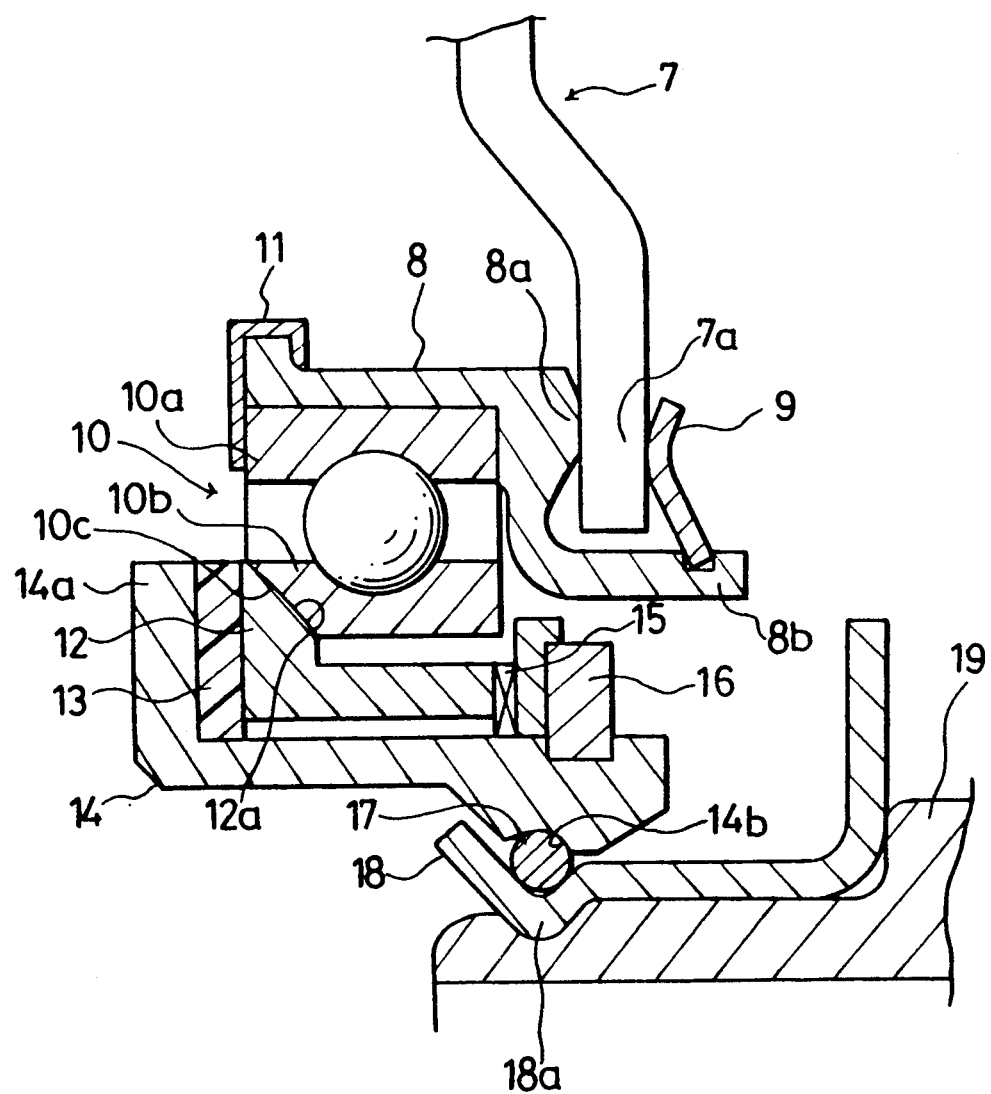
FIG. 2 is a partly sectional view of a release assembly.
Figure 4:
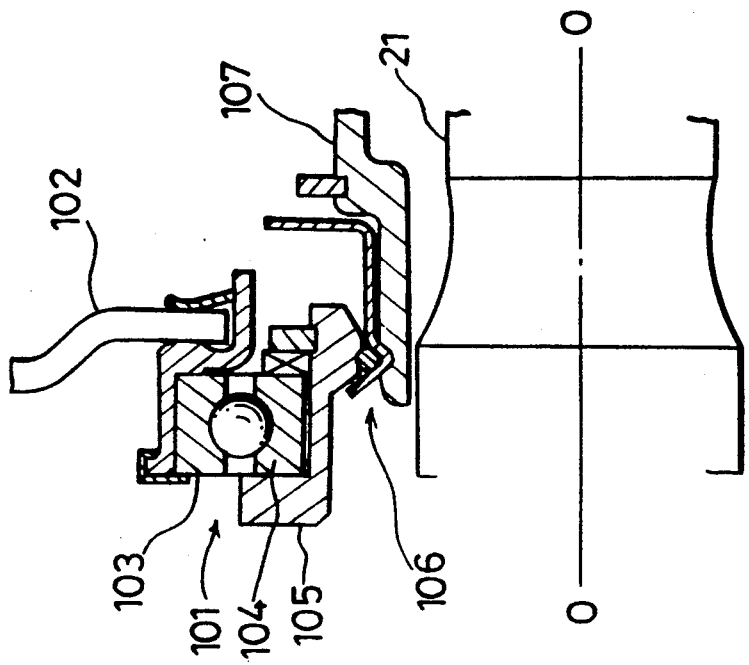
FIG. 4 is a partly sectional view of a conventional release assembly.

Initially the clutch disc 2 and the clutch cover assembly 1 including the release bearing 10, the wedge collar 18 onto which the snap ring 17 fits, the wedge collar 18 and associated elements attached to the radially inward margin 7a of the diaphragm spring 7 are in assemblage as shown in FIGS. 1 and 2. The transmission housing 20, incorporating the main drive shaft 21, the support sleeve 19 and the sleeve driving mechanism 22, is made to approach and join into the clutch cover assembly 1. As a result, the end of the support sleeve 19 is snapped into the wedge collar 18, and then the snap ring 17 is fitted into the groove of the annular protuberance 14b.

Figure 3:
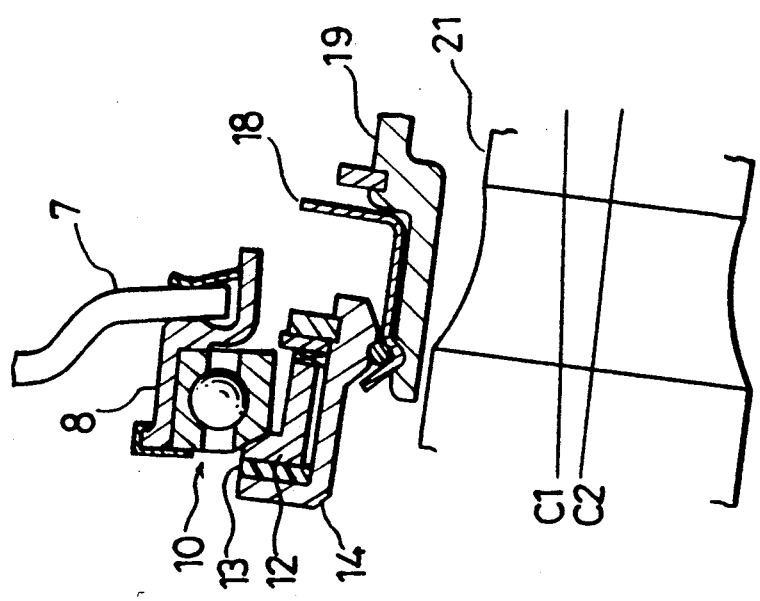
FIG. 3 is a partly sectional view showing a misalignment of a transmission and a clutch.

When the assembly is completed, as shown in FIG. 3 (in which skew has been exaggerated for purpose of clarity), the positional axis C2 of the transmission 20 may be on a bias from the ideal axis C1. In this case, however, sliding of the spherical surface 12a of the seat 12 along the spherical surface 10c of the inner race 10b compensates for the misalignments, since the pivotal deviation of the release assembly 3 taken as a whole is around the pivotal deviation center point B in the main drive shaft 21, and the spherical surfaces 10c and 12a coincide with sphere C of radius R and whose center point is B. The radial clearance between the spherically surfaced seat 12 and the retainer 14 permits radial movement of seat 12 which absorbs radial misalignment.

Accordingly, in this embodiment, even if the clutch and the transmission come into misalignment, or in case the clutch and the transmission are not coaxial, no resultant stresses are transmitted to the mounting portion of the release bearing 10 and associated members, thus resulting in improved durability of the release assembly 3.

The clutch operation will now be explained.

When hydraulic pressure is supplied to the oil chamber 24 from an outside hydraulic power source (not shown) through the hydraulic pressure pipe 25, the support sleeve 19 is driven backward (rightward in FIG. 1). The support sleeve 19 draws the radially inward portion 7a of the diaphragm spring 7 axially backward through the release bearing 10 and associated members, and the pressure plate is drawn backward, releasing the clutch disc 2. When the supply of hydraulic pressure to the sleeve driving mechanism 22 ceases, the diaphragm spring 7 presses the pressure plate 6 engine-ward by virtue of its own elasticity, whereby the clutch disc 2 is engaged.

Various details of the invention may be changed without departing from its spirit nor its scope. Furthermore, the foregoing description of the embodiment according to the present invention is provided for the purpose of the illustration only, and not for the purpose of the limiting the invention as defined by the appended claims and their equivalents.

What is claimed is:

1. A release assembly for a pull-type clutch which connects a diaphragm spring with a support sleeve for a slidable movement on a transmission main drive shaft, comprising:

a release bearing having an outer race fixed to said diaphragm spring and an inner race having a lateral surface formed with a spherically shaped concavity formed generally along a circumference of a sphere having a center point located approximately at a tip of the main drive shaft proximate an output shaft of an engine; and a retaining tube connected to said support sleeve, having a lateral surface formed with a convex spherically shaped surface which slidably mates with said spherically shaped concavity, whereby said convex spherically shaped surface remains mating with said spherically shaped concavity in spite of misalignment of an axis of said main drive shaft with an axis of rotation of said clutch.

2. A release assembly for a pull-type clutch as recited in claim 1, wherein said retaining tube includes a retainer connected to said support sleeve, and a tubular bearing seat elastically retained in said retainer and having said convex spherically shaped surface.

3. A release assembly for a pull-type clutch as recited in claim 1, wherein said clutch diaphragm spring is supported in a clutch cover fixed to an engine flywheel attached to the output shaft of the engine, a tip of said main drive shaft is supported at a central portion of said flywheel at an axial distance from said release assembly, and said mating spherical surfaces have a radius equal to a distance from said spherical surfaces to a center point of said main drive shaft tip.

4. A release assembly for a pull-type clutch as recited in claim 2, wherein said retainer is a tubular member and wherein said seat is elastically held in said retainer with a radial clearance therebetween for absorbing radial misalignment of the release assembly with said main shaft axis.

5. A release assembly for a pull-type clutch as recited in claim 3, wherein said retainer is a tubular member and wherein said seat is elastically held in said retainer with a radial clearance therebetween for absorbing radial misalignment of the release assembly with said main shaft axis.

6. A release assembly according to claim 2, further comprising connecting means detachably connecting said retainer and said support sleeve including a wedge collar fitted on said support sleeve, a groove in an annular internal protuberance of said retainer, and a snap ring fitted in said groove and in a peripheral channel formed in said wedge collar.

7. A release assembly according to claim 6, further comprising driving means for slidably driving said support sleeve in an axial direction on said main drive shaft.

8. A release assembly according to claim 7, further comprising an annular support member fixed to said outer race and connected to a radially inward margin of said diaphragm spring for extracting said diaphragm spring in a direction toward said transmission by operation of said driving means.

9. A pull-type clutch system for connecting an output shaft of an engine with a main drive shaft of a transmission comprising:
   a flywheel connected to said output shaft and having a radially inward portion fitted onto said main drive shaft at a pivotal deviation center of said main drive shaft;
   a clutch disc having a peripheral portion arranged in contact with said flywheel and a radially inner portion fitted onto said main drive shaft;
   a pressure plate positioned to press the clutch disc peripheral portion against the flywheel;
   a diaphragm spring for driving said pressure plate toward said clutch disc;
   a release assembly including a release bearing having an outer race fixed to a radially inward margin of said diaphragm spring and an inner race having a lateral surface formed with a spherically shaped concavity, and retaining tube for a slidable movement axially on said main drive shaft, having a complementary convex spherically shaped surface for mating with and slidably supporting said spherically shaped concavity, said spherically shaped surfaces being formed at a radius from said pivotal deviation center; and
   driving means for driving said release assembly axially on said main drive shaft to engage and release said clutch disc.

10. A pull-type clutch system as recited in claim 9, wherein said retaining tube includes a retainer, and a tubular bearing seat elastically retained in said retainer and having said convex spherically shaped surface.

11. A pull-type clutch system according to claim 10, wherein said release assembly further includes a sleeve disposed on said main drive shaft for supporting said retainer, said sleeve being connected to said driving means.

12. A pull-type clutch system according to claim 11, further include means connecting said bearing seat with said retainer for absorbing radial misalignment of the release assembly and the main drive shaft, said connecting means comprising means for elastically clamping said bearing seat in engagement with said retainer, inner circumference of said bearing seat being greater than external circumference of said retainer such that a radial clearance is maintained therebetween.

13. A pull-type clutch system according to claim 11, wherein said release assembly further comprises means for detachably connecting said retainer and said support sleeve including a wedge collar fitted on said support sleeve, a groove in an annular internal protuberance of said retainer, and a snap ring fitted in said groove in a peripheral channel formed in said wedge collar.

* * * * *